United States Patent [19]

Oono et al.

[11] Patent Number: 6,051,949
[45] Date of Patent: Apr. 18, 2000

[54] APPARATUS FOR DRIVING STEPPING MOTOR OF CAMERA

[75] Inventors: Masahiro Oono, Saitama-ken; Hisao Iwanade, Tokyo; Noboru Saitoh, Saitama-ken; Koji Sato, Saitama-ken; Sukenori Shiba, Saitama-ken; Tatsuya Yoshida, Saitama-ken; Nobuyuki Nagai, Saitama-ken, all of Japan

[73] Assignee: Asahi Kogaku Kogyo Kabushiki Kaisha, Tokyo, Japan

[21] Appl. No.: 09/020,861

[22] Filed: Feb. 9, 1998

[30] Foreign Application Priority Data

Feb. 10, 1997 [JP] Japan ................................. 9-026896

[51] Int. Cl.[7] .................................................. G05B 19/40
[52] U.S. Cl. .......................... 318/685; 318/696; 396/132; 396/135
[58] Field of Search ..................................... 318/685, 696, 318/362–382; 396/133, 135, 132

[56] References Cited

U.S. PATENT DOCUMENTS

| 4,812,727 | 3/1989 | Sakai et al. .............................. 318/696 |
| 5,117,137 | 5/1992 | Kobayashi . |
| 5,126,896 | 6/1992 | Yamagata .............................. 360/78.04 |
| 5,594,311 | 1/1997 | Yasuda et al. .......................... 318/685 |

*Primary Examiner*—David Martin
*Attorney, Agent, or Firm*—Greenblum & Bernstein, P.L.C.

[57] ABSTRACT

A stepping motor driving apparatus for a camera includes 1-2 phase excitation type stepping motors and a drive controller for driving and stopping the stepping motors so that the driven stepping motors are stopped always at a detent position.

16 Claims, 10 Drawing Sheets

APPARATUS FOR DRIVING STEPPING MOTOR OF CAMERA

BACKGROUND OF THE INVENTION

1. Field of the Invention

The present invention relates to an apparatus for driving a stepping (stepper) motor, in particularly incorporated in a digital still camera.

2. Description of the Related Art

Recently cameras have been employing a motor for driving the auto-focus system. In the case of a DC motor, a relative position detecting device which detects a relative position with respect to a reference position using an encoder or the like is used as a means for detecting a position of a focusing lens. It is necessary to provide a space in which the encoder is accommodated in the camera. Also, a means for detecting the output of the encoder must be incorporated in the camera.

To this end, it is possible to use a stepping motor (stepper motor) in which the angular displacement can be controlled stepwise in the auto-focusing system for a photographing lens. In a 1-2 phase excitation system stepping motor (half-step drive system) which has a large rotational torque and a simple control circuit, if the power supply is stopped at a 1-phase excitation position, i.e., if no excitation occurs, the rotor is stopped at the 1-phase excitation position (detent position). However, if the power supply is stopped at a 2-phase excitation position (equilibrium position), the rotor is in a position between the detent positions and hence, the rotor tends to rotate to one of the detent positions. Consequently, if the excitation is ceased at the 2-phase excitation position, the rotor rotates to and stops at a detent position adjacent to the 2-phase excitation position, thus resulting in an occurrence of an error in the stop position. In order to prevent this, it is necessary to hold the 2-phase excitation to maintain a stable position when the power supply is ceased at the 2-phase excitation position. This causes an increase in the power consumption.

It is an object of the present invention to provide a drive apparatus for a stepping motor of a camera, in which the power consumption of a 1-2 phase excitation stepping motor can be reduced.

SUMMARY OF THE INVENTION

To achieve the object mentioned above, according to an aspect of the present invention, there is provided a stepping motor driving apparatus for a camera, comprising a 1-2 phase excitation type stepping motor and a drive controller for driving and stopping the stepping motor so that the driven stepping motor is stopped at a 1-phase excitation position.

If the 1-2 phase excitation type stepping motor is used for moving a focusing lens group of a photographing lens, for opening and closing a diaphragm or for the zooming operation of a zoom lens, the position thereof can be controlled in accordance with the number of the drive pulses of the stepping motor. Since the stepping motor is stopped at the 1-phase excitation position, i.e., a detent position, the power consumption can be reduced.

The present disclosure relates to subject matter contained in Japanese Patent Application No. 09-26896 (filed on Feb. 10, 1997) which is expressly incorporated herein by reference in its entirety.

BRIEF DESCRIPTION OF THE DRAWINGS

The invention will be described below in detail with reference to the accompanying drawings in which.

DESCRIPTION OF THE PREFERRED EMBODIMENT

The illustrated embodiment is applied to a digital camera having a power zoom lens. The digital camera includes a zoom lens portion having a power zoom photographing lens and a CCD image pickup device, and a camera portion having an image recorder, such as a memory card and a color liquid crystal display.

Figure 1:
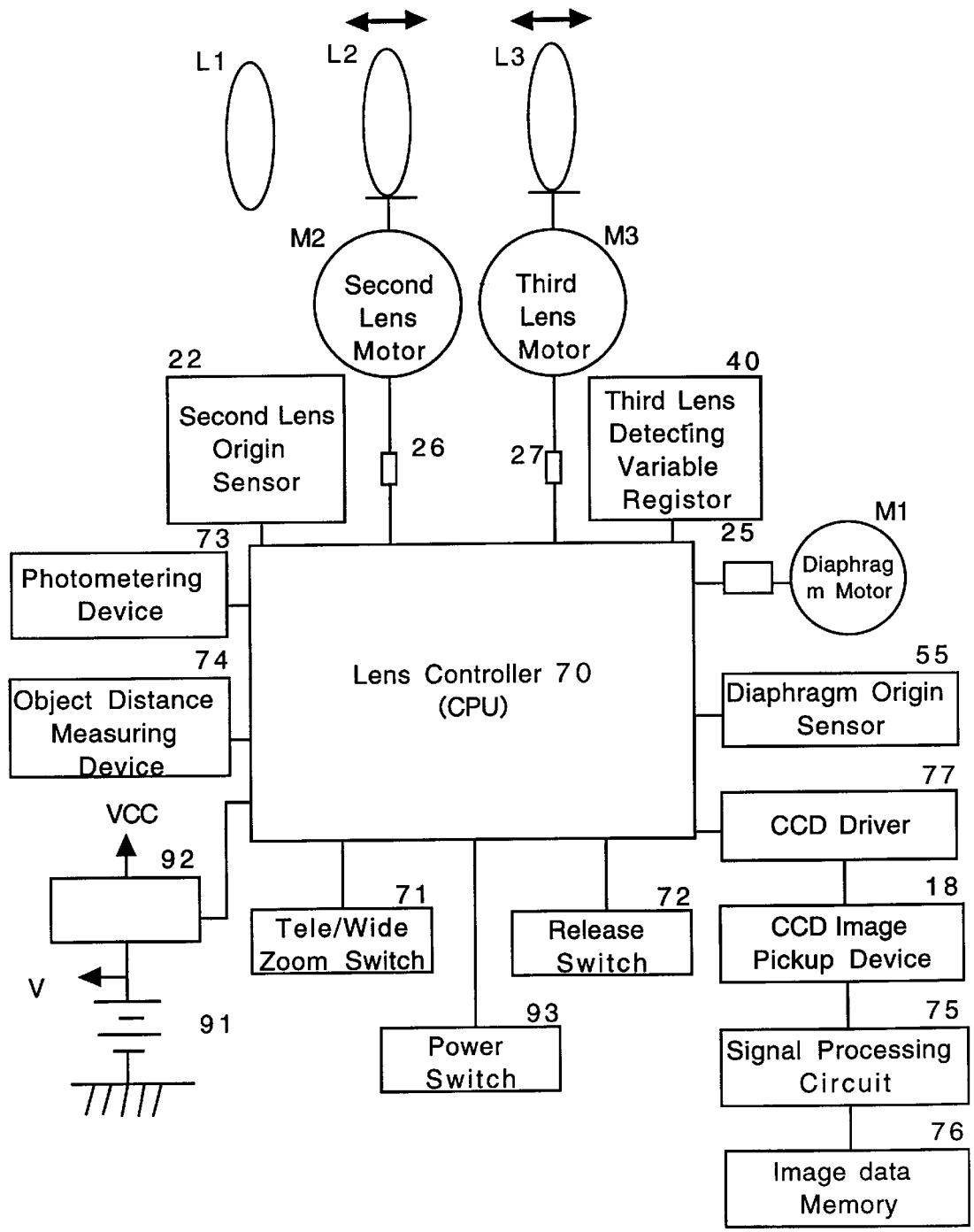
FIG. 1 is a block diagram of a digital still camera to which the present invention is applied.

The lens control system provided in the zoom lens portion will be explained below with reference to FIG. 1. Connected to the lens controller (CPU) 70 is a diaphragm stepping motor (first motor) M1 for driving the diaphragm, a second lens stepping motor (second motor) M2 for driving a second lens group L2 of the zoom lens, and a third lens motor (third motor) M3 for driving the third lens group L3 of the zoom lens through motor drivers 25, 26 and 27, respectively. The stepping motors M1, M2, and M3 each constitute a 1-2 phase excitation stepping motor.

Moreover, connected to the lens controller 70 is a second lens group initial-position sensor 22 for detecting the origin of the second lens group L2, a third lens position detecting variable registor 40 for detecting the absolute position of the third lens group L3, a diaphragm initial position sensor 55 for detecting the initial position (full-open position) of the diaphragm, a color image pick-up device (CCD) 18, a zoom switch 71 having a tele-switch and/or wide-switch, a release switch 72, a photometering device 73 for measuring the object brightness, and an object distance measuring device 74. The photometering device 73 usually constitutes the CCD 18, but is shown as a separate member for clarity. The object distance measuring device 74 can be either a passive type or an active type. In the illustrated embodiment, a passive type of object distance measuring device 74 is used to detect the defocus.

The CCD image pickup device 18 is driven by a CCD driver 77 and converts an optical object image formed thereon into an electrical image signal which is transmitted to the signal processing circuit 75. The signal processing circuit 75 converts the electrical image signal input thereto into digital image data which is recorded in an image-data memory 76. A built-in flash memory or a detachable memory card, can be used as a recording medium for the image-data memory 76.

A battery 91 which supplies electric power to the electronic devices mentioned above is provided in the camera body, so that when the power switch 93 is turned ON, the power is supplied to the electronic devices of the zoom lens portion directly or through a regulator 92. For clarity, it is assumed that these devices are provided in the zoom lens and that the power switch 93 is connected to the controller 70, so that when the latter is turned ON, the power can be supplied to the electronic devices through the regulator 92. The power switch 93 functions also as a photographing mode switch which is adapted to pick-up an image when the release switch 72 is turned ON and to record the digital image signals in the image-data image-data memory 76.

In the illustrated embodiment, the zoom lens is composed of a first positive stationary lens group L1, a second negative movable lens group L2 and a third positive movable lens group L3. This lens system is of a variable focus type in which the zooming operation is carried out by moving the second and third lens groups L2 and L3 and the focusing operation is carried out by moving the second lens group L2. However, no cam groove is used to control the relative position of the second and third lens groups L2 and L3. The positions of the second lens group L2 and the third lens group L3 are controlled in an open loop and a closed loop, respectively, in accordance with the set focal length data (position data of the second lens group L2) and the object distance data (object distance). Note that, for clarity, in the illustrated embodiment, the second lens group L2 is referred to as a focusing lens group; the second lens stepping motor M2 is referred to as a focusing motor; the third lens group L3 is referred to as a zoom lens group; and, the third lens motor M3 is referred to as a zoom motor, respectively.

The stepping motors M1, M2 and M3 each constitute a 1-2 phase excitation stepping motor. The stepping motors are stopped at any detent positions (1-phase excitation position) when the excitation is ceased. Namely, if the power supply is ceased in the 1-phase excited state, the rotational shaft (rotor) is stopped at that position, and if the power supply is ceased in the 2-phase excited state, the rotational shaft (rotor) can be stopped at that position, but in many cases, the rotor is rotated to the adjacent 1-phase excitation position in the clockwise direction or counterclockwise direction and stops at that detent position.

The principle behind the configuration and the driving of the 1-2 phase (variable-phase) excitation type stepping motor which is employed in the present invention will be explained below with reference to FIGS. 9A, 9B, 9C and 10.

The drive circuit for this type of stepping motor receives electric pulses, causing the rotor to rotate in the clockwise direction in the following order: terminals (A0~A1) and (B0~B1) (2-phase [twin-phase-group] excitation), terminals (B0~B1) (1-phase [single-phase-group] excitation), terminals (B0~B1) and (A1~A0) (2-phase [twin-phase-group] excitation), terminals (A1~A0) (1-phase [single-phase-group] excitation), terminals (A1~A0) and (B1~B0) (2-phase [twin-phase-group] excitation), and terminals (A0~A1) (1-phase [single-phase-group] excitation). When the power is cut off at the 1-phase excitation position, (e.g., as in FIGS. 9A or 9C) since the north and south poles of the rotor 111 are attracted to the poles 103A and 103*a* of the stator 101, the rotor stops at that position (the 1-phase excitation position). In other words, the 1-phase excitation position is in a detent position that can maintain a stationary rotor position even when excitation is ceased.

Figure 9:
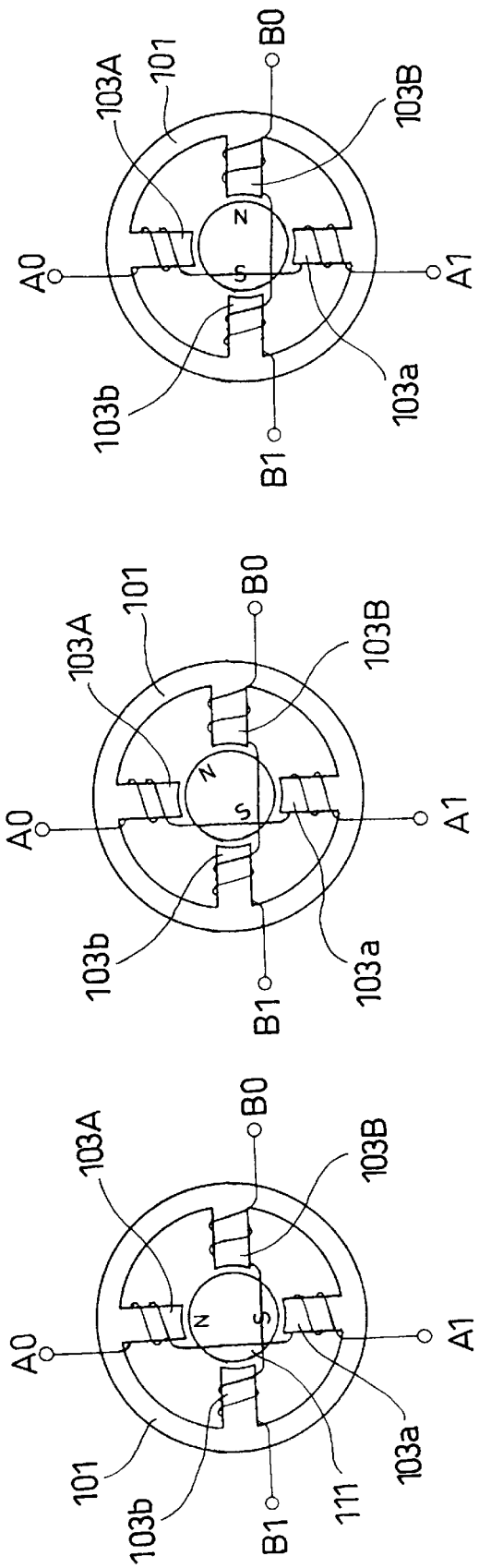
FIGS. 9A, 9B and 9C show the principle configuration and driving of a variable-phase excitation type stepper motor.
Figure 10:
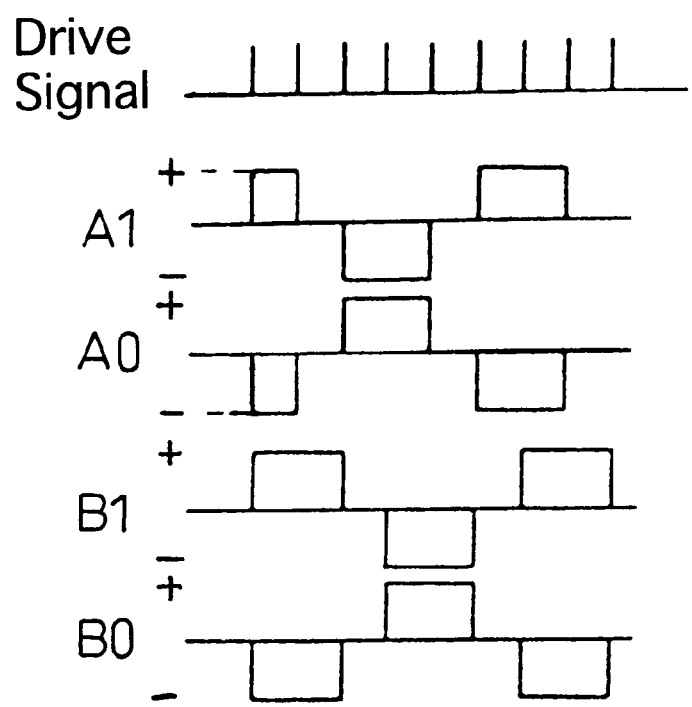
FIG. 10 is a timing chart of the variable-phase excitation type stepper motor shown in FIGS. 9A, 9B and 9C.

However, in the 2-phase excitation position of FIG. 9B, since the north pole of the rotor is attracted to poles 103A and 103B, and the south pole of the rotor is attracted to poles 103*a* and 103*b*, the north and south poles of the rotor 111 stop in between the neighboring poles 103A, 103B and 103*a* and 103*b*, respectively. When the power is cut off at the 2-phase excitation position, the north and south poles are attracted to one of the neighboring poles 103A, 103B and 103*a*, 103*b*, respectively. Hence, the rotor 111 rotates to one of each pair the above-mentioned neighboring poles of stator 101, and stops. In other words, the 2-phase excitation position is an 'equilibrium state' whereby the rotor 111 rotates to one of each pair of the neighboring detents when excitation is terminated.

It must be noted that the above explanation of the 1-2 phase excitation stepping motor explains the main principle and does not limit the scope thereof.

In the illustrated embodiment, the stepping motors M1, M2, M3 are always stopped at the 1-phase excitation position (detent position). Consequently, the drive (excitation) of the stepping motors M1, M2 and M3 is controlled so that the 2-phase excitation always takes place first and the excitation is ceased at the 1-phase excitation position. Namely, the drive is always controlled at a two-step angular displacement (unit displacement). Further more, the illustrated embodiment always commences with a 2-phase excitation from a 1-phase position driving the stepping motor one step at a time. If a 1-phase excitation were to occur before a 2-phase excitation, the 1-phase excitation would not be in step with the driving numbers.

The lens controller 70 sets the accuracy of calculation to obtain the diaphragm value and the focal length and the accuracy of the focusing operation in accordance with the two-step angular displacement (even pulse number) of the stepping motors M1, M2 and M3. Namely, the lens controller 70 sets the number of drive signals in accordance with the diaphragm value and the movement of the second and third lens groups L2 and L3, that vary when the stepping motors M1, M2 and M3 rotate by an angular displacement corresponding to one step. If the number is odd, the set number is rounded up or down to obtain an even number.

Alternatively, it is possible to drive the motor drivers 25, 26 and 27 by a two-step angular displacement due to the 1-phase excitation and the 2-phase excitation, when one pulse is supplied from the lens controller 70 to the motor M1, M2 or M3. In this alternative, the lens controller 70 sets the number of drive pulses in accordance with the diaphragm value and the movement of the second and third lens groups L2 and L3, that vary when the stepping motors M1, M2 and M3 rotate by an angle corresponding to two steps. The set values can be either even numbers or odd numbers.

Figure 2:
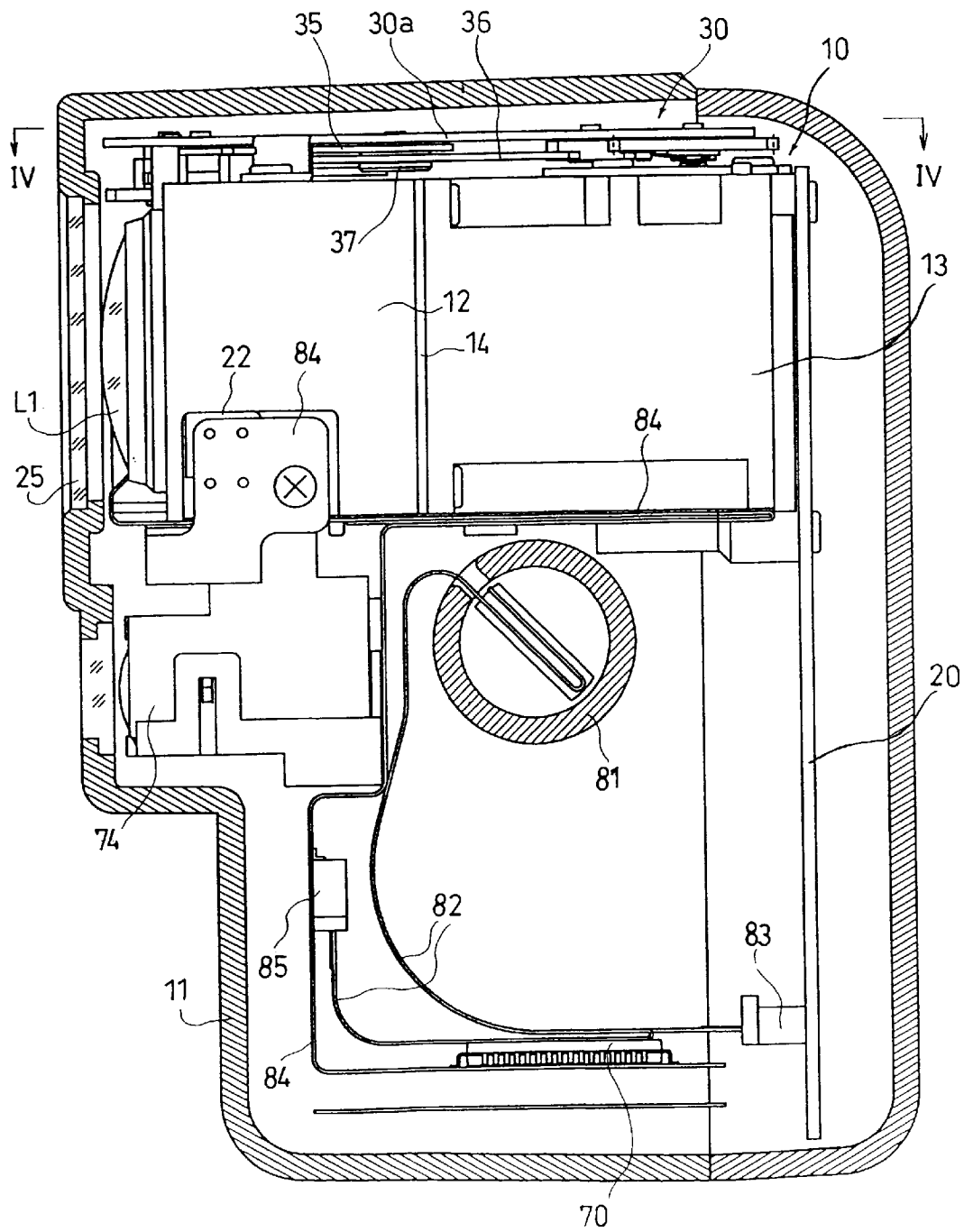
FIG. 2 is a left side view of a zoom lens portion in which the casing is sectioned.
Figure 5:
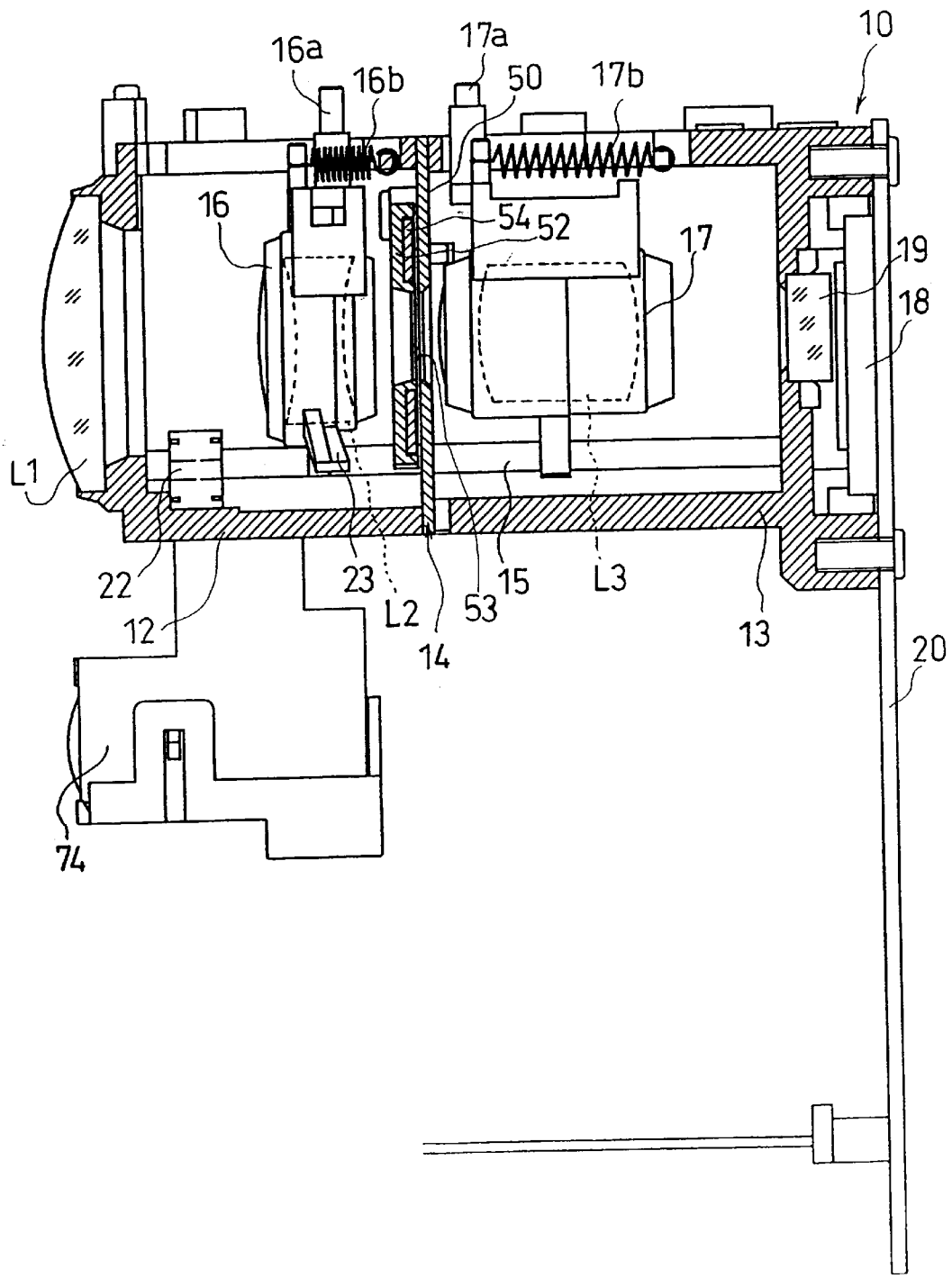
FIG. 5 is a partially longitudinally sectioned left side view of a lens unit before a lens drive unit is incorporated, shown in a telephoto position.

The mechanical structure of the zoom lens to which the present invention is applied will be explained below. The lens barrel body 10 provided in the lens casing 11 is essentially composed of a front plastic body 12, a rear plastic body 13 and a diaphragm block 14 held between the front and rear plastic bodies 12 and 13. There are a plurality of guide rods 15 (only one of which is shown in FIG. 5) which extend in parallel with the optical axis and by which a second lens frame 16 which holds the second lens group L2 and a third lens frame 17 which holds the third lens group L3 are movably guided. The CCD 18 is located behind the third lens frame 17 and is secured to the rear body 13 through the substrate 20 thereof. 19 designates the crystal filter. The casing 11 is provided with a glass cover (plane-parallel plate) 25 (FIGS. 2 and 3) secured thereto and located in front of the first lens group L1.

The second lens frame 16 and the third lens frame 17 are respectively provided with upwardly extending second and third lens pins 16*a* and 17*a*. The second and third lens frames 16 and 17 are biased rearward (toward the CCD 18) by tensile springs 16*b* and 17*b* for removing backlash.

The front body 12 is provided with a photodetector (initial position sensor) 22 to detect the origin of the second lens frame 16 (second lens group L2). The second lens frame 16 is equipped with a dog plate 23 secured thereto to cooperate with the photodetector 22. In the illustrated embodiment, the origin of the second lens group L2 corresponds to an infinite object distance at the wide-angle extremity. When the second lens group L2 is located at the origin, the dog plate 23 interrupts the light from the photodetector 22 to detect the origin. The movement of the second lens group L2 from the origin is controlled by the lens controller 70 in accordance with the number of pulses for driving the second lens group L2. Alternatively, it is also possible to control the movement of the second lens group L2 from the origin using a pulser.

As may be supposed from the telephoto position shown in FIG. 5, when the focal length varies from the telephoto extremity toward the wide-angle extremity, the second lens frame 16 (second lens group L2) is moved forward and the third lens frame 17 (third lens group L3) is moved rearward. Namely, when the focal length is changed, the second and third lens frames 16 and 17 (second and third lens groups L2 and L3) are moved always in opposite directions.

The drive mechanism which drives the second lens frame 16 and the third lens frame 17 within the lens barrel body 10 is assembled as a lens drive unit 30 and is mounted to bridge the front body 12 and the rear body 13. The second lens stepping motor M2 and the third lens stepping motor M3 are secured to the lower surface of the second mother plate (substrate) 32 so that the output shafts of the stepping motors M2 and M3 extend perpendicularly to the second substrate 32. The second drive plate 35 which is provided with a cam groove (lead groove), in which the second lens pin 16*a* of the second lens frame 16 is fitted, and a third drive plate 36 which is provided with a cam groove (lead groove), in which the third lens pin 17*a* of the third lens frame 17 is fitted, are coaxially pivoted to the first substrate 31 by a common shaft 37. The second lens pin 16*a* and the third lens pin 17*a* are always in contact with the surface of the rear side of the cam groove (adjacent the CCD image pickup device 18) through the tensile springs 16*b* and 17*b*, respectively, to eliminate backlash.

There is a gear mechanism 38 which transmits the rotation of the second lens stepping motor M2 to the second lens drive plate 35, a gear mechanism 39 which transmits the rotation of the third lens stepping motor M3 to the third lens drive plate 36, and a volume mechanism (variable resistor) associated with the third lens drive plate 36, between the first and second mother plates 31 and 32. The lens controller 70 receives the resistance of the volume mechanism and converts the same into position data of the third lens group L3.

Figure 3:
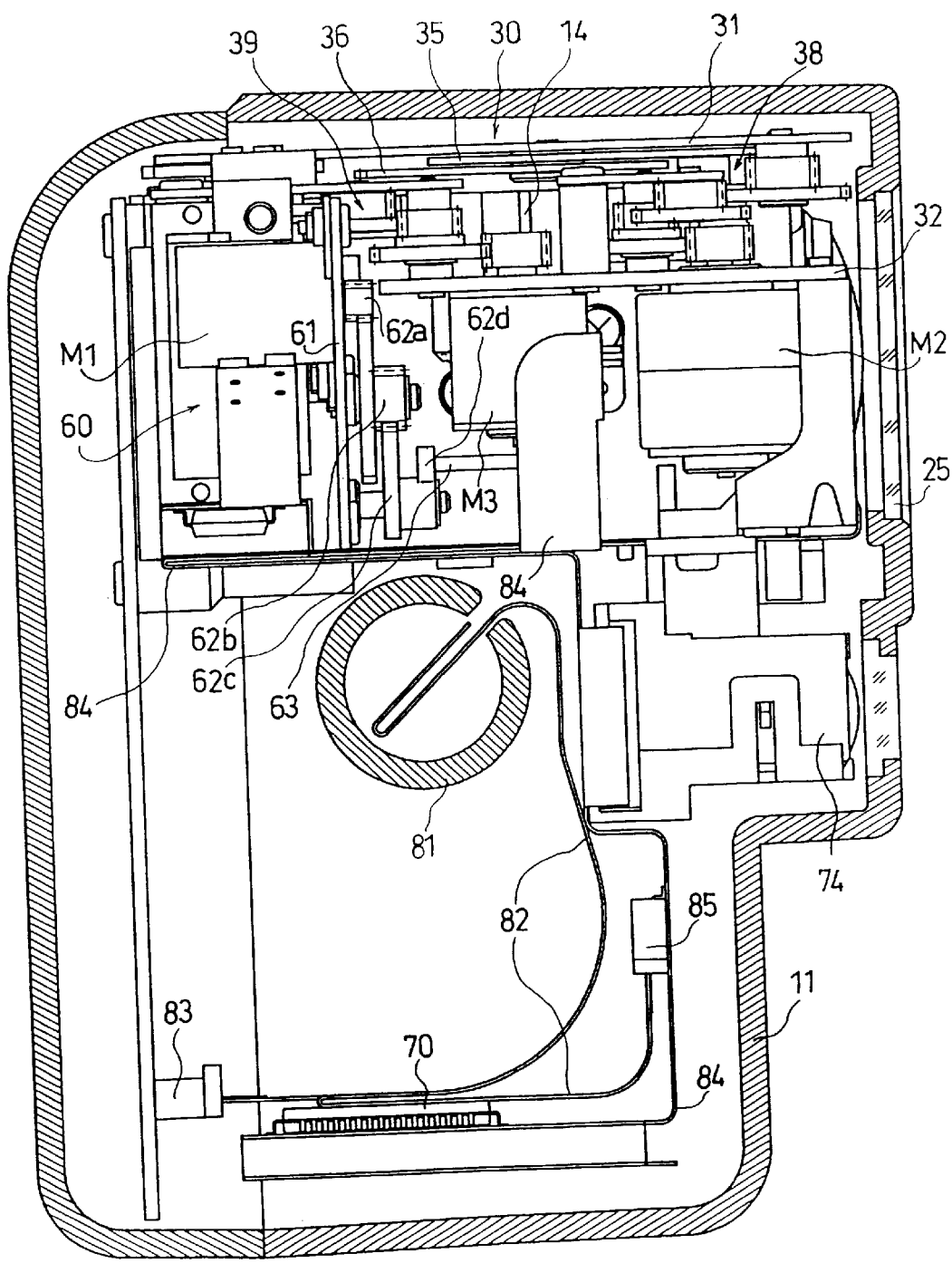
FIG. 3 is a right side view of FIG. 2.
Figure 4:
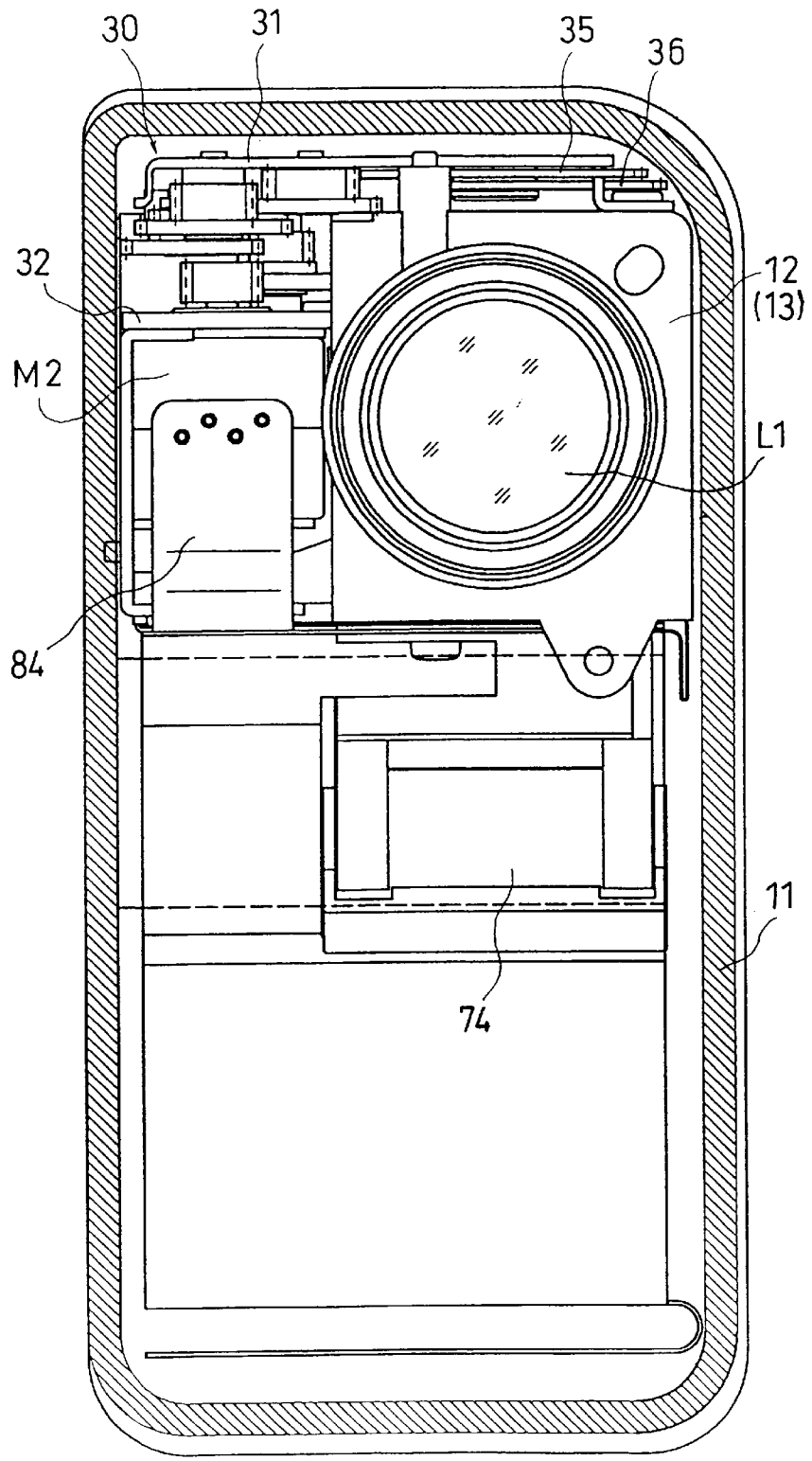
FIG. 4 is a front elevational view of FIG. 2.

In FIG. 3, numeral 60 designates a diaphragm drive unit which drives the diaphragm block 14 held between the front body 12 and the rear body 13. The diaphragm block 14 is secured between the first and second bodies 12 and 13 through the substrate 50. The diaphragm block 14 is provided with a retainer 52 secured to the substrate 50, diaphragm blades 53, an opening and closing ring 54 which opens or closes the diaphragm blades 53, and a photosensor (not shown) as a position detector which detects the position of the origin (full-open position) of the diaphragm blades 53. The lens controller 70 detects the original position of the diaphragm block 14 (diaphragm mechanism ) through the photosensor.

The diaphragm drive unit 60 forms a separate unit which is secured to the rear body 13 at positions different from the diaphragm block 14 in the optical axis direction and the radial direction. The diaphragm stepping motor M1 is secured to the substrate 61 of the drive unit 60. The first gear 62*a* of the drive shaft thereof is functionally connected to the sector gear 62*c* through the second gear 62*b*. The sector gear 62*c* is provided with a radial arm integral therewith, which is in turn provided with an association pin 63 which is fitted in the radial groove of the opening and closing ring 54. Namely, when the diaphragm stepping motor M1 rotates so that the radial arm 62*d* is rotated, the opening and closing ring 54 is rotated to open or close the diaphragm blades 53. The diaphragm stepping motor M1 is stopped at the detent position.

The lens casing 11 is connected to the body casing (not shown) through the cylindrical boss 81 (FIGS. 2 and 3) at the substantially center portion so as to rotate by an angle less than 360_. The body casing is equipped with the zoom switch, the release switch, the signal processing circuit, the memory, a liquid crystal display (LCD) panel with a finder function, in which the object image formed on the CCD 18 is displayed, a body CPU, and various function switches. The electric circuits in the body casing are connected to the electric circuits in the lens casing 11 through a body-lens connecting FPC board 82 which extends through the cylindrical boss 81. Namely, the FPC board 82 connected to the CPU within the body casing is connected to a connector 83 provided on the substrate 20 and a connector 85 provided on an FPC board 84 on the lens side, through the cylindrical boss 81. The FPC board 84 on the lens side is provided with a printed circuit to which all the electrical elements within the casing 11 are connected and electronic devices such as the lens CPU 70.

Figure 6:
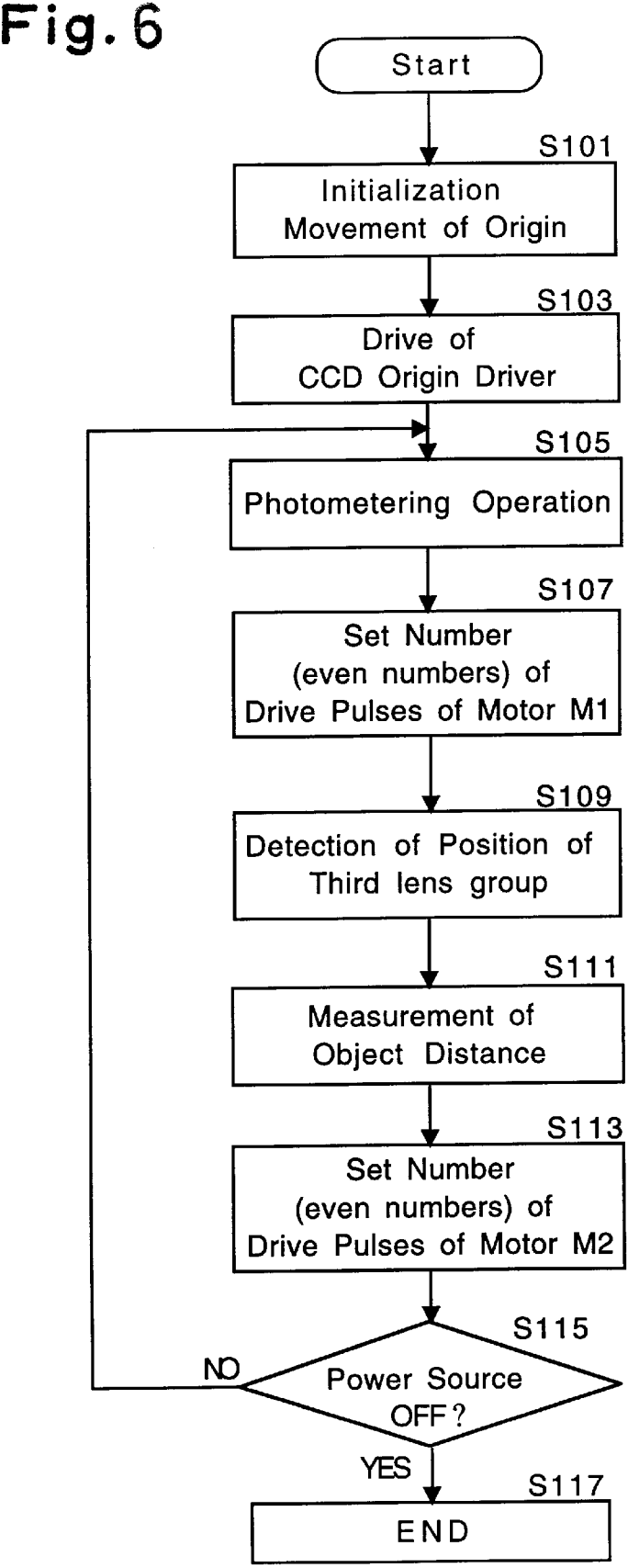
FIG. 6 is a flow chart of the basic operation of a digital still camera to which the present invention is applied.

The lens controller 70 operates as follows. FIG. 6 shows a flow chart of the operation of an embodiment in which the photometering operation and the focusing operation are always carried out when the power switch 93 is ON. When the power switch is turned ON (photographing mode is set), the lens controller 70 initializes the internal RAM and the counter, to start the timer and drive the motors M1, M2 and M3. Consequently, the diaphragm blades 53 are opened to the origin (initial position) and the second and third lens groups L2 and L3 are moved to the origin (initial position). The movement of the motors M1, M2 and M3 is stopped at the detent position (1-phase excitation position) (S101).

Thereafter, the image pickup operation by the CCD image pickup device 18 is carried out by the CCD driver 77 (S103). In the illustrated embodiment, the CCD driver 77, once driven, continues the image pickup operation until it receives a stop signal or the power supply is stopped.

The object brightness is detected by the photometering device 73 (S105), and the diaphragm value to obtain an appropriate quantity of light is calculated and set in accordance with the detected object brightness to thereby determine the number of drive pulses (even numbers) of the diaphragm stepping motor M1 necessary to drive the same from the initial position thereof (S107).

Thereafter, the absolute position of the third lens group L3 is detected through the variable registor 40 (S109), and the object distance is measured by the object distance measuring device 74 (S111). Consequently, the second lens group L2 is calculated and set in accordance with the detected object distance and the position data of the third lens group L3 to thereby determine the number of drive pulses (even numbers) of the second lens stepping motor M2 necessary to drive the same from the initial position thereof (S113). The operations from S105 to S115 are repeated until the power is turned OFF (S115, No; S105 through S115).

If the power source is turned OFF, the control ends (S115, yes; S117). The end operation includes at least the power off operation and the termination of the CCD driver 77 and can include the movement of the motors M1, M2 and M3 to the respective initial positions.

Figure 7:
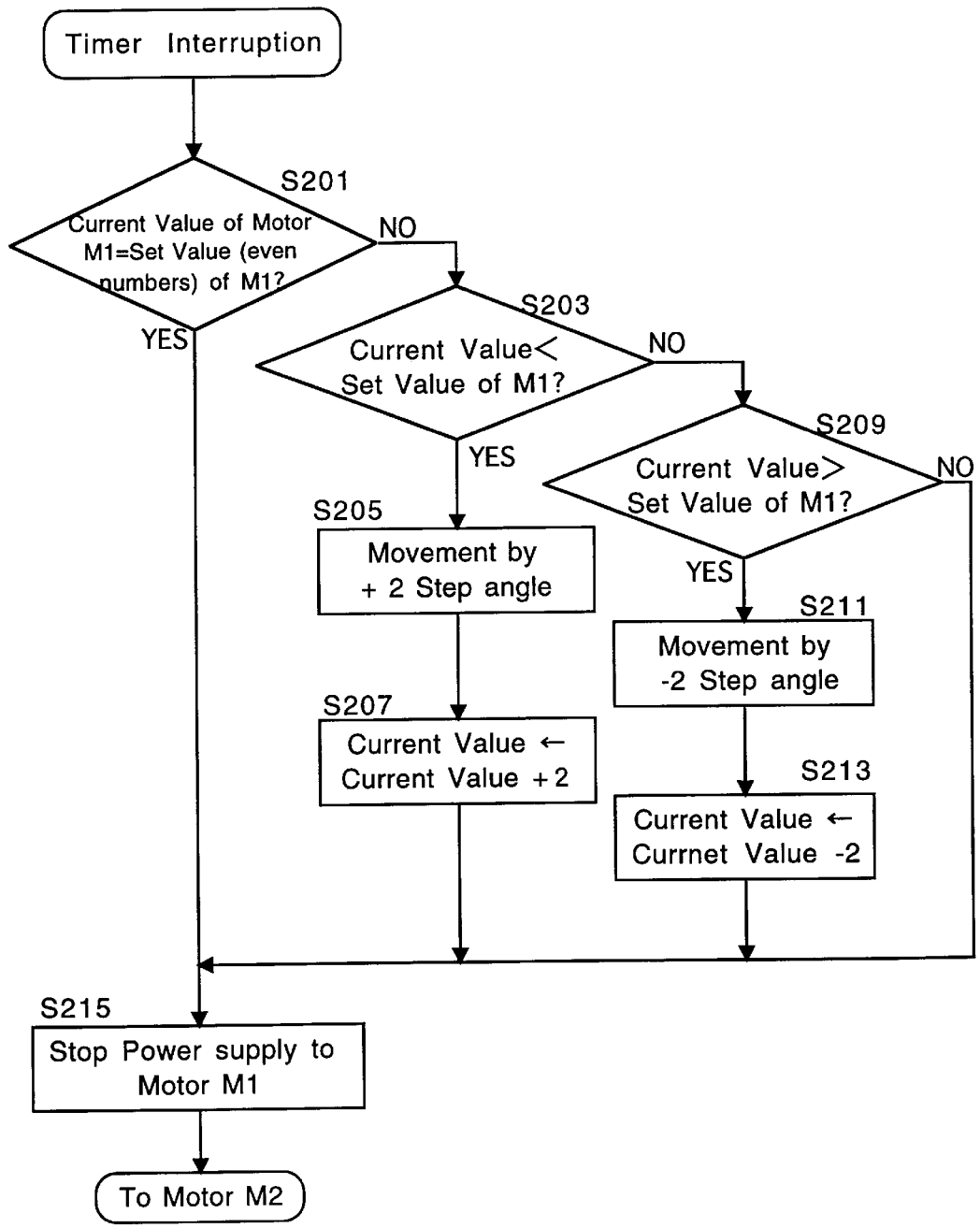
FIG. 7 is a flow chart of a stepping motor driving operation in a digital still camera to which the present invention is applied.
Figure 8:
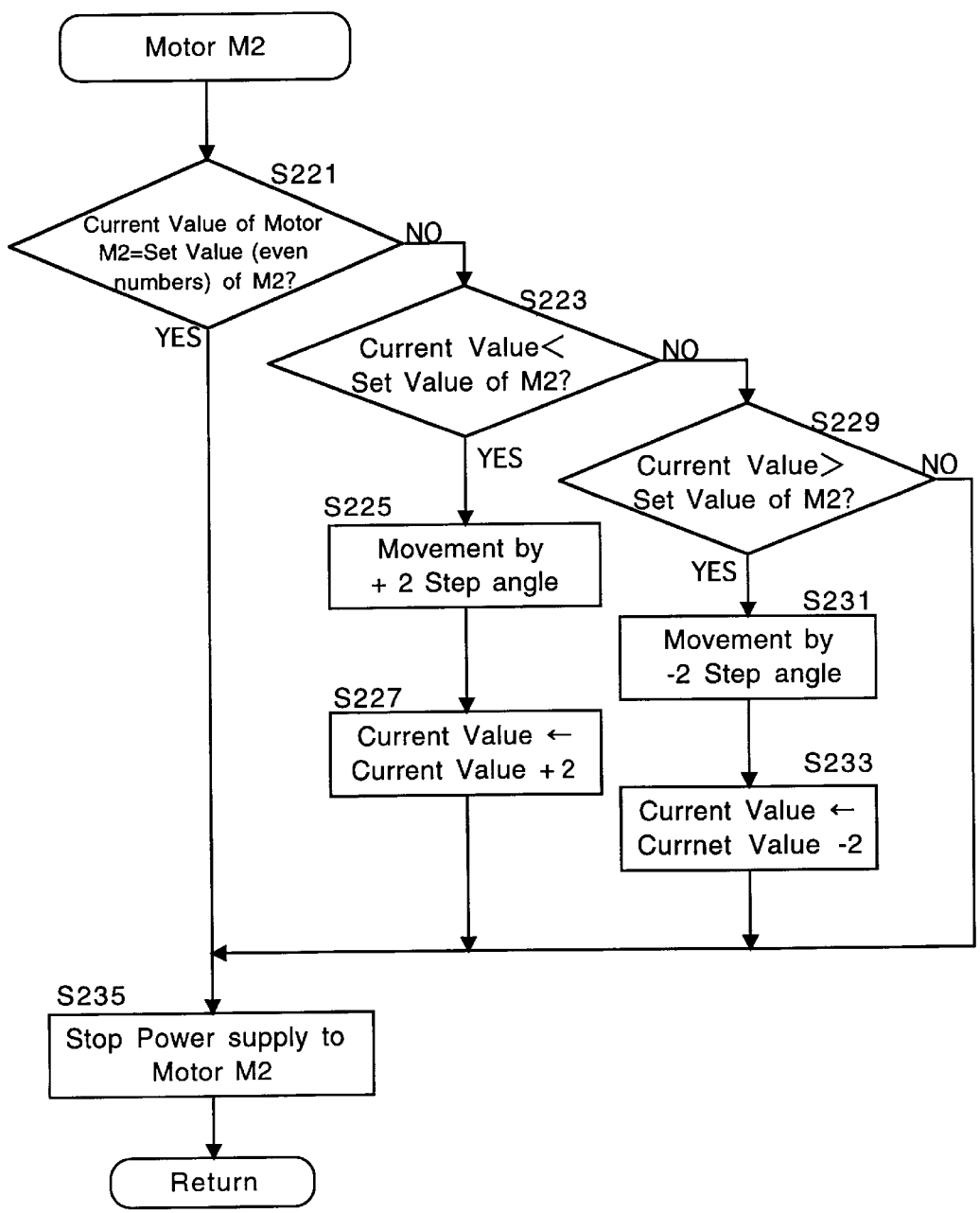
FIG. 8 is a flow chart of a stepping motor driving operation in a digital still camera to which the present invention is applied.

The lens controller 70 drives the motors M1 and M2 in accordance with the respective set numbers of pulses if the timer interruption occurs during the operation mentioned above. The synopsis of the drive operation will be discussed below with reference to FIGS. 7 and 8.

The control enters this routine periodically for example at an interval of 1ms, due to the timer which starts at step S101. First, a check is made to determine whether the current value of the number of drive pulses of the diaphragm stepping motor M1 is identical to the value set at step S107. If both the values are identical, the power supply to the diaphragm stepping motor M1 is suspended, and thereafter the control proceeds to the operation of the stepping motor M2 (S201, Yes; S215). If the current value of the number of drive pulses of the diaphragm stepping motor M1 is less than the set value, the diaphragm stepping motor M1 is driven in the forward direction by a two-step angular displacement to add two to the current value, and thereafter, the power supply to the diaphragm stepping motor M1 is stopped (S201, No; S203, Yes; S205; S207; S215). Thereafter, the control proceeds to the operation of the stepping motor M2. If the current value of the number of drive pulses of the diaphragm stepping motor M1 is greater than the set value, the diaphragm stepping motor M1 is driven in the reverse direction by a two-step angular displacement to subtract two from the current value, and thereafter, the power supply to the diaphragm stepping motor M1 is stopped (S201, No; S203, No; S209, Yes; S211; S213; S215) and the control proceeds to the operation of the stepping motor M2.

The second lens stepping motor M2 is driven in the same way as the diaphragm stepping motor M1. Namely, a check is made to determine whether or not the current value of the number of drive pulses of the second lens stepping motor M2 is identical to the value set at step S113. If both the values are identical, the power supply to the second lens stepping motor M2 is suspended, and thereafter the control is returned (S221, Yes; S235). If the current value of the number of drive pulses of the stepping motor M2 is smaller than the set value, the stepping motor M2 is driven in the forward direction by a two-step angular displacement to add two to the current value. If the current value of the number of drive pulses of the diaphragm stepping motor M1 is greater than the set value, the second lens stepping motor M2 is driven in the reverse direction by a two-step angular displacement to subtract two from the current value, and thereafter, the power supply to the M2 is stopped (S221, No; S223, Yes; S225; S227; S235). If the current value of the number of drive pulses of the second lens stepping motor M2 is greater than the set value, the stepping motor M2 is driven in the reverse direction by a two step angular displacement to subtract two from the current value, and thereafter, the power supply to the stepping motor M2 is stopped (S221, No; S223, No; S229, Yes; S231; S233; S235). Thereafter, the control is returned.

As may be seen from the above discussion, according to the present invention, the 1-2 phase excitation stepping motors M1 and M2 are driven at a step angular displacement of even numbers and are stopped at the 1-phase excitation position (detent position) by ceasing the power supply thereto, and hence the stop position of the stepping motors M1 and M2 can be maintained without power consumption.

If the zoom switch 71 is turned ON while the operations from S105 to S115 are repeated, the lens controller 70 performs the interruption operation, and drives the motors M2 and M3 by a two-step angular displacement to stop at the 1-phase excitation position. At the telephoto extremity shown in FIG. 5, if the zoom switch is moved toward the wide-angle position, the lens controller 70 drives the second and third lens stepping motors M2 and M3 by a two-step angular displacement as a result of the interruption operation to thereby move the second and third lens frames 16 and 17 (second and third lens groups L2 and L3) forward and rearward, respectively.

If the zoom switch is turned ON toward the telephoto direction, the control is interrupted and the lens controller 70 drives the second and third lens stepping motors M2 and M3 by a two-step angular displacement to move the second and third lens frames 16 and 17 (second and third lens groups L2 and L3) rearward and forward, respectively.

When the second or third lens frame 16 or 17 reaches the wide angle extremity or telephoto extremity, or the zoom switch is turned OFF, the lens controller 70 stops the power supply to the second lens stepping motor M2 and the third lens stepping motor M3 to thereby stop the operation thereof at the 1-phase excitation position. Note that since the position of the third lens group L3 is detected by the variable registor 40, it is not necessary to detect the number of the drive pulses of the third lens stepping motor M3.

The lens controller 70 sets the number of drive pulses of the diaphragm stepping motor M1 in accordance with the focal length set by the zooming operation and the object brightness measured by the photometering device 73, and sets the number (even numbers) of drive pulses of the second lens stepping motor M2 in accordance with the thus set focal length, the object distance measured by the object distance measuring device 74, and the brightness measured by the photometering device 73 (S105 through S113). Consequently, the diaphragm stepping motor M1 is driven from its initial position (detected by the diaphragm origin sensor 55) in accordance with the number of the drive pulses to move the diaphragm blades 53 to a position corresponding to the set diaphragm value. Likewise, the second lens stepping motor M2 is driven from its initial position (detected by the second lens origin sensor 22) in accordance with the number of the drive pulses to move the second lens group L2 along the optical axis to thereby focus the lens on the object. Namely, if the position of the third lens group L3 (focal length) is set by the zoom switch 71, the position of the second lens group L2 can be determined in accordance with the set focal length and the object distance measured by the object distance measuring device 74. Thus, the in-focus object image can be formed on the CCD image pickup device 18.

With this embodiment, since when the release switch 72 is depressed, the lens has already been focused on the object, the image pickup operation can be carried out in the focused state by the CCD image pickup device 18 without time lag.

The position of the second lens group L2 (number of the drive pulses of the second lens stepping motor from its initial position) determined in accordance with the focal length and the object distance is obtained in advance by calculation or by measurement and is shown in a table stored for example in an EEPROM. The stored data can be read as necessary.

In the case that the number of the drive pulses is calculated in accordance with the focal length and the object distance, if the number is odd, it is rounded up or down to obtain an even number.

Although the photometering device 73 and the object-distance measuring device 74 operate regardless of the ON or OFF state of the release switch 72 so long as the power source is ON in the illustrated embodiment, it is possible to actuate the photometering device 73 and the object distance measuring device 74 when the release switch 72 is turned ON. Namely, if the release switch 72 is depressed by half a step, the photometering device 73 and the object distance measuring device 74 are actuated to obtain the object brightness data and the object distance data, but the stepping motors M1 or M2 are not driven. If the release switch 72 is depressed by full step, the stepping motors M1 and M2 are actuated, and thus the image pickup operation by the image pickup device 18 is carried out. Consequently, the power consumption of the battery can be reduced.

As can be understood from the above discussion, according to the present invention, when the 1-2 phase excitation stepping motors M1, M2 and M3 are driven, the 2-phase excitation and 1-phase excitation are sequentially repeated. The power supply to the stepping motors is ceased always after the 1-phase excitation occurs. Thus, the stepping motors are stopped always at the detent position. Therefore, the stop position can be maintained due to the detent torque without exciting the motors, the service life of the battery can be extended.

Although the above discussion has been directed to a digital still camera having three 1-2 phase excitation stepping motors, the present invention is not limited thereto and can be applied to a camera having a 1-2 phase excitation stepping motor in general. Moreover, although the zoom lens portion having a detachable photographing lens is attached to the camera body portion having an image data storing means in the illustrated embodiment, the present invention can be applied to a digital still camera in which the zoom lens portion and the camera body portion are formed as one body.

As may be understood from the above discussion, according to the present invention, in a camera having 1-2 phase excitation type stepping motors, when the stepping motors are stopped, the power supply thereto is ceased always at the 1-phase excitation position (detent position), and hence, the stop position can be maintained due to the detent torque without supplying the power to the motors, thus resulting in a reduced power consumption of the battery. Furthermore, since the stepping motors are used, the positions of the elements driven thereby can be controlled in accordance with the number of drive pulses thereof.

What is claimed is:

1. A stepping motor driving apparatus for a camera, comprising:
   at least two 1-2 phase excitation type stepping motors, each of said at least two 1-2 phase excitation motors driving one system selected from a focusing lens system, a diaphragm system, and a zooming lens system, and each of said at least two 1-2 phase excitation type stepping motors having a plurality of 1-phase excitation positions;
   a drive controller which drives said stepping motors to respective determined positions; and
   a timer interrupt controller that activates said drive controller to (i) alternate between driving each of said at least two stepping motors on a predetermined cycle, and to (ii) always stop driving each of said at least two stepping motors at one of said plurality of 1-phase excitation positions before driving a next one of said at least two stepping motors, said timer interrupt controller alternating between driving each of said at least two stepping motors until said respective determined positions are reached.

2. The stepping motor driving apparatus according to claim 1, said drive controller setting said respective determined positions as a quantity of driving of each of said at least two stepping motors using even numbers of drive pulses with respect to any one of said plurality of 1-phase excitation positions.

3. A stepping motor driving apparatus according to claim 1, wherein one of said stepping motors is adapted to drive said focusing lens system to move a focusing lens group of a photographing lens.

4. A stepping motor driving apparatus according to claim 3, further comprising an object distance measuring device that measures an object distance, and a calculator that calculates a number of drive pulses necessary to move said focusing lens group of said photographing lens from an initial position thereof in accordance with a measurement of said object distance measuring device in order to determine a focal position of said focusing lens group, wherein said drive controller drives said one of said at least two stepping motors in accordance with said number of said drive pulses.

5. A stepping motor driving apparatus according to claim 4, wherein said calculation device sets said number of said drive pulses so that said one of said at least two stepping motors is stopped always at a detent position corresponding to said 1-phase excitation position.

6. A stepping motor driving apparatus according to claim 4, wherein said camera comprises an initial position detecting means for detecting said initial position of said focusing lens group.

7. A stepping motor driving apparatus according to claim 1, wherein one of said stepping motors is adapted to drive said diaphragm system to open or close a diaphragm of a photographing lens.

8. A stepping motor driving apparatus according to claim 7, further comprising a photometering device that measures an object brightness, and a calculator that calculates a number of drive pulses necessary to move said diaphragm from an initial position in accordance with measurement of said object brightness in order to determine an appropriate diaphragm value, wherein said drive controller drives said one of said at least two stepping motors in accordance with said number of said drive pulses.

9. A stepping motor driving apparatus according to claim 8, wherein said calculation device sets said number of said drive pulses so that said one of said at least two stepping motors is stopped always at a detent position corresponding to one of said plurality of 1-phase excitation positions.

10. A stepping motor driving apparatus according to claim 8, wherein said camera comprises an initial position detecting means for detecting said intial position of said diaphragm.

11. A stepping motor driving apparatus according to claim 1, wherein said drive controller always commences with a 2-phase excitation from any one of said plurality of 1-phase excitation positions driving each of said at least two stepping motors one step at a time.

12. A stepping motor driving apparatus according to claim 1, wherein one of said stepping motors is adapted to drive said zooming lens system to move a zooming lens group of a photographing lens.

13. A stepping motor driving apparatus according to claim 12, further comprising a zoom switch movable to a plurality of positions including a wide-angle position, an OFF position, and a telephoto position, wherein said drive controller drives said one of said at least two stepping motors depending on a selected position of said plurality of positions to which said zoom switch is moved.

14. A stepping motor driving apparatus according to claim 13, wherein a remaining one of said stepping motors is adapted to drive a focusing lens system to move a focusing lens group of a photographing lens, and wherein said drive controller drives both of said one of said at least two stepping motors and said remaining one of said at least two stepping motors in accordance with said selected position of said zoom switch.

15. A stepping motor driving apparatus for a camera, comprising:

at least two 1-2 phase excitation type stepping motors, one of said at least two 1-2 phase excitation motors driving a diaphragm system, and a remaining one of said at least two 1-2 phase excitation motors driving a focusing lens system, each of said at least two 1-2 phase excitation type stepping motors having a plurality of 1-phase excitation positions;

a drive controller which drives said stepping motors to respective determined positions; and a timer interrupt controller that activates said drive controller to (i) alternate between driving each of said at least two stepping motors on a predetermined cycle, and to (ii) always stop driving each of said at least two stepping motors at one of said plurality of 1-phase excitation positions before driving a next one of said at least two stepping motors, said timer interrupt controller alternating between driving each of said at least two stepping motors until said respective determined positions are reached.

16. A stepping motor driving apparatus for a camera, comprising:

at least two 1-2 phase excitation type stepping motors, one of said at least two 1-2 phase excitation motors driving a focusing lens system, and a remaining one of said at least two 1-2 phase excitation motors driving a zooming lens system, each of said at least two 1-2 phase excitation type stepping motors having a plurality of 1-phase excitation positions;

a drive controller which drives said stepping motors to respective determined positions; and a timer interrupt controller that activates said drive controller to (i) alternate between driving each of said at least two stepping motors on a predetermined cycle, and to (ii) always stop driving each of said at least two stepping motors at one of said plurality of 1-phase excitation positions before driving a next one of said at least two stepping motors, said timer interrupt controller alternating between driving each of said at least two stepping motors until said respective determined positions are reached.

\* \* \* \* \*